United States Patent

Konuma et al.

[11] Patent Number: 6,065,838
[45] Date of Patent: May 23, 2000

[54] LIQUID CRYSTAL PROJECTOR

[75] Inventors: Nobuhiro Konuma, Yokohama; Yutaka Matsuda, Fujisawa; Masaharu Deguchi, Yokohama; Hisao Inage, Yokosuka; Takashi Kakuda, Yokohama, all of Japan

[73] Assignee: Hitachi Ltd., Tokyo, Japan

[21] Appl. No.: 08/959,433

[22] Filed: Oct. 28, 1997

[30] Foreign Application Priority Data

Oct. 31, 1996 [JP] Japan ................................ 8-290528
Oct. 31, 1996 [JP] Japan ................................ 8-290529

[51] Int. Cl.[7] .................................................. G03B 21/16
[52] U.S. Cl. ................................ 353/61; 353/38; 353/57; 353/119
[58] Field of Search ................................ 353/61, 60, 57, 353/55, 52, 31, 33, 34, 37, 119, 38

[56] References Cited

U.S. PATENT DOCUMENTS

| | | | |
|---|---|---|---|
| 1,879,600 | 9/1932 | Burchett | 353/57 |
| 3,512,883 | 5/1970 | Noble | 353/61 |
| 3,902,799 | 9/1975 | Winkler et al. | 353/61 |
| 3,920,323 | 11/1975 | Nishitani | 353/61 |
| 4,682,868 | 7/1987 | Coustantin et al. | 353/61 |
| 5,313,234 | 5/1994 | Edmonson et al. | 353/61 |
| 5,626,409 | 5/1997 | Nakayama et al. | 353/31 |
| 5,738,427 | 4/1998 | Booth et al. | 353/60 |
| 5,806,952 | 9/1998 | Fujimori | 353/57 |
| 5,826,959 | 10/1998 | Atsuchi | 353/34 |
| 5,863,125 | 1/1999 | Doany | 353/31 |

FOREIGN PATENT DOCUMENTS

| | | |
|---|---|---|
| 63-216026 | 3/1987 | Japan . |
| 3-10218 | 6/1989 | Japan . |
| 5-59424 | 1/1992 | Japan . |
| 5-034825 | 2/1993 | Japan . |
| 7-114104 | 9/1995 | Japan . |
| 7-311420 | 11/1995 | Japan . |

OTHER PUBLICATIONS

Masumoto, Yoshihiro, et al., High Efficient Optical Illumination System for Liquid Crystal Projector Using Varied Aperture Lens Array, 22Fa06 of Optical Federation Symposium, Hamamatsu 1994, pp. 135–136.

*Primary Examiner*—William Dowling
*Attorney, Agent, or Firm*—R. William Beard, Jr.; Frohwitter

[57] ABSTRACT

A liquid crystal projector, having a configuration in which an exhaust fan is arranged adjacently to a projection lens at an angle to the optical axis of the projection lens, a configuration including a plurality of tilted wind-directing plates, a configuration in which the arrangement of a first reflection mirror, a first lens array, a light source and the exhaust fan is substantially parallel and adjacent to the arrangement of the projection lens, a dichroic prism and a second dichroic mirror, and/or a configuration in which the lens array has the incident surface thereof made of a concave lens.

16 Claims, 10 Drawing Sheets

LIQUID CRYSTAL PROJECTOR

BACKGROUND OF THE INVENTION

The present invention relates to a liquid crystal projector using a transmission liquid crystal panel, or more in particular to (1) a liquid crystal projector for projecting the illumination light from a light source on a liquid crystal panel, and projecting an image of the liquid crystal panel on a screen through a projection lens. The invention also relates to (2) a liquid crystal projector in which the illumination light from a light source is split into three colors of R, G and B by a dichroic mirror and irradiated on three liquid crystal panels, images on the three liquid crystal panels are synthesized in color through a dichroic prism and a synthesized image is projected on a screen through a projection lens. Further, the invention relates to (3) a liquid crystal projector in which the illumination light from a light source is irradiated on a liquid crystal panel through a reflector, a first lens array and a second lens array so that the light emitted from the liquid crystal panel is projected on a screen by a projection lens.

A conventional liquid crystal projector using a transmission liquid crystal of this type is known, as described in JP-A-63-216026, for example, which comprises a light source (corresponding to 21), a first reflection mirror (corresponding to 23), a first dichroic mirror (corresponding to 26), a second reflection mirror (corresponding to 30), a second dichroic mirror (corresponding to 27), a third reflection mirror (corresponding to 28), a fourth reflection mirror (corresponding to 29), a first transmission liquid crystal panel (corresponding to 33), a second transmission liquid crystal panel (corresponding to 39), a third transmission liquid crystal panel (corresponding to 45), a dichroic prism (corresponding to 49) and a projection lens (corresponding to 50), wherein the illumination light from the light source is irradiated on the first dichroic mirror through the first reflection mirror, the first emitted light split in color by the first dichroic mirror is irradiated on the first liquid crystal panel through the second reflection mirror, the second emitted light split in color by the first dichroic mirror is irradiated on the second dichroic mirror, the first emitted light split in color by the second dichroic mirror is irradiated on the second liquid crystal panel, the second emitted light split in color by the second dichroic mirror is irradiated on the third liquid crystal panel through the third reflection mirror and the fourth reflection mirror, the transmitted light from the first liquid crystal panel, the transmitted light from the second liquid crystal panel and the transmitted light from the third liquid crystal panel are synthesized in color by the dichroic prism, and the emitted light thus synthesized in color is projected on the screen by the projection lens.

Another conventional liquid crystal projector is known, as disclosed in JP-A-3-10218, comprising an exhaust fan (corresponding to 15, 27) for cooling a light source.

As disclosed in "High-Efficiency Illumination Optical System for Liquid Crystal Projector Using Deformed Open Lens Array", 22Fa06 of Optical Federation Symposium, Hamamatsu '94, pp.135–136, JAPAN OPTICS '94, sponsored by the Japan Optical Society (Application Physics Association), for example, a liquid crystal projector is known, comprising a light source including a metal halide lamp and a parabolic mirror, a UV-IR cut filter, a first lens array and a second lens array.

A liquid crystal projector configured of a combination of the above-mentioned three conventional liquid crystal projectors already finds applications. The prior art will be described below with reference to the drawings.

Figure 9:
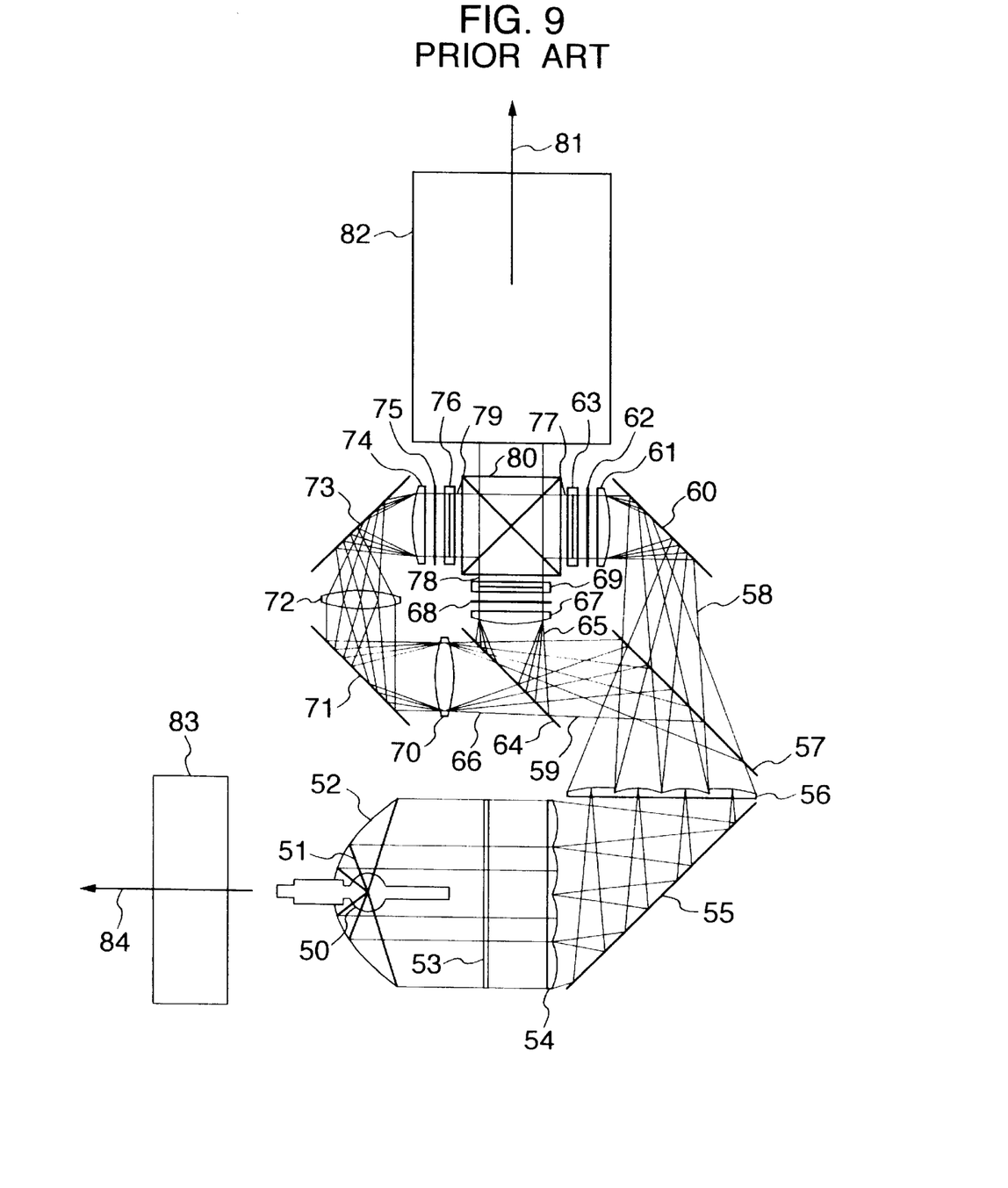
FIG. 9 is a top plan view of an optical system of a conventional liquid crystal projector.

FIG. 9 is a diagram showing an optical system of a liquid crystal projector comprising a combination of the above-mentioned configurations of the conventional liquid crystal projectors.

The illumination light 51 from a metal halide lamp 50 constituting a light source enters a lamp reflector 52 of a parabolic mirror, a UV-IR cut filter 53, a first lens array 54, a cold mirror 55 constituting a first reflection mirror, a second lens array 56, and a first dichroic mirror 57 for transmitting the R color light and reflecting the G and B color light, so that the R color light 58 is transmitted and the G and R color light 59 are reflected. The R color light 58 is reflected on an increased reflection aluminum mirror 60 constituting a second reflection mirror, and enters a R color light liquid crystal panel 63 constituting a first transmission liquid crystal panel through a condenser lens 61 and a polarizing plate 62. The G and B color light 59 enter a second dichroic mirror 64 which reflects the G color light and transmits the B color light, so that the G color light 65 is reflected and the B color light 66 is transmitted. The G color light 65 enters a G color light liquid crystal panel 69 making up a second transmission liquid crystal panel through a condenser lens 67 and a polarizing plate 68. The B color light 66, on the other hand, enters a B color light liquid crystal panel 76 making up a third transmission liquid crystal panel through a relay lens 70, an increased reflection aluminum mirror 71 making up a third reflection mirror, a relay lens 72, an increased reflection aluminum mirror 73 making up a fourth reflection mirror, a condenser lens 74 and a polarizing plate 75.

The R transmitted light 77 from the liquid crystal panel 63, the G transmitted light 78 from the liquid crystal panel 69 and the B transmitted light 79 from the liquid crystal panel 76 are synthesized in color by a dichroic prism 80. The emitted light 81 thus synthesized in color is projected on a screen (not shown) by a projection lens 82.

In order to prevent the heat generated by the high-temperature light source from having an effect on the component parts other than the light source, an exhaust fan 83 for cooling the light source is arranged in the neighborhood of the metal halide lamp 50 and the lamp reflector 52 thereby to exhaust the hot air 84 out of the housing (not shown) of the liquid crystal projector.

The liquid crystal projector having this configuration can produce a bright, large image on the screen while cooling the high-temperature light source. Also, the first lens array 54 and the second lens array 56 configured as an optical integrator can irradiate a uniform illumination light on the liquid crystal panels 63, 69, 76, thus producing a bright, large image on the screen with a uniform peripheral illuminance. In the conventional liquid crystal projector of this configuration, however, has the problem that the hot air 84 exhausted by the exhaust fan 83 often flows toward the viewers located in the neighborhood of the liquid crystal projector and thus gives the feeling of discomfort to the viewers. Also, the liquid crystal projector is sometimes used in the vicinity of the video equipment such as the personal computer liable to succumb to heat easily. In such a case, such video equipment is required to be located at a position not exposed to the hot air. Further, in order to efficiently exhaust the heat generated from the light source, care must be exercised not to place any object constituting a stumbling block to the exhaustion in a path of the hot air, thereby posing the problem of operating inconveniences.

On the other hand, JP-A-5-59424 (UM) proposes a configuration in which an exhaust fan for cooling a light source is arranged in the same plane as the front cylinder section of a projection lens so that the light is projected in the same direction as the hot air is exhausted. In this configuration, the hot air exhausted from the exhaust fan is prevented from flowing toward the viewers located in the neighborhood of the liquid crystal projector. The viewers thus feel no inconvenience, nor is it necessary to take care not to arrange the equipment easily affected by heat in the neighborhood of the liquid crystal projector or to place an object constituting a stumbling block to the exhaustion in a path of the hot air. It is thus possible to obtain a liquid crystal projector convenient to use. Nevertheless, this configuration fails to take into consideration the fact that the hot air exhausted from the exhaust fan may flow into the projected light from the projection lens and cause fluctuations of the image projected on the screen. Also, no care is taken about a configuration of wind-directing plates to assure an efficient exhaustion of the hot air. Further, no special consideration is taken about the configuration of the optical system including the first lens array and the second lens array.

Figure 10:
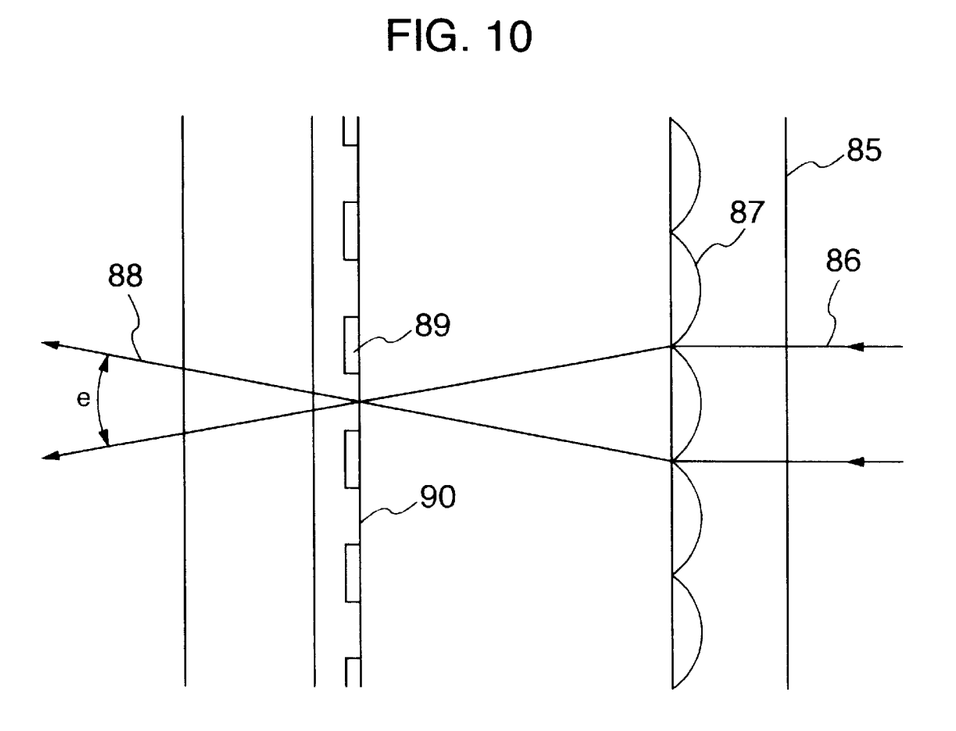
FIG. 10 is a sectional view of a liquid crystal panel with micro-lenses.
Figure 11:
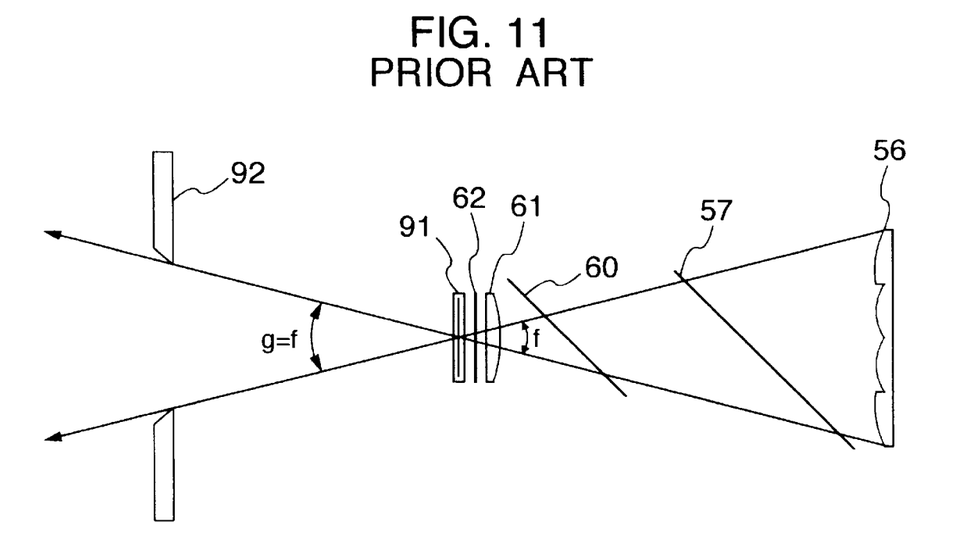
FIG. 11 is a diagram showing light rays from the second lens array 4 to the projection lens aperture 92 for a conventional liquid crystal panel without any micro-lenses.
Figure 12:
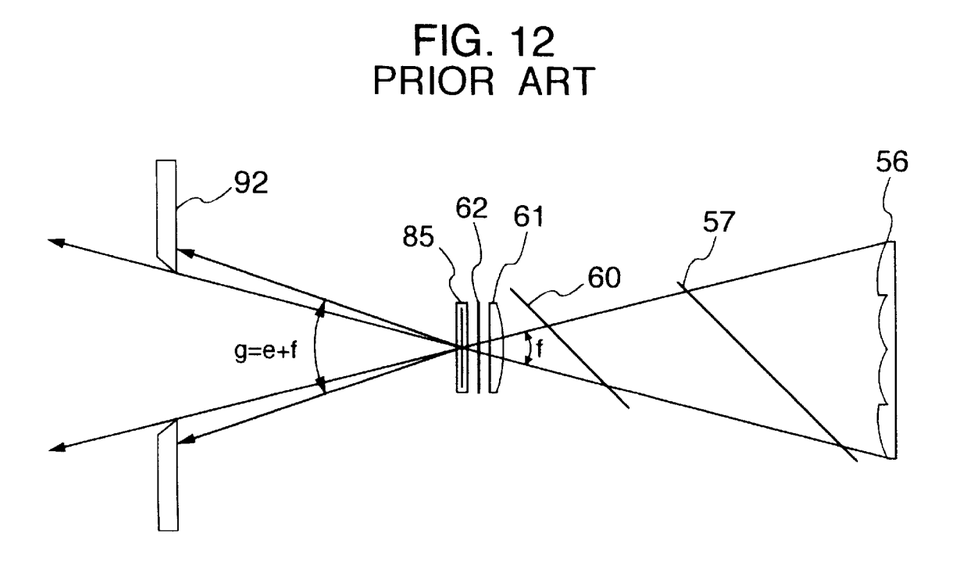
FIG. 12 is a diagram showing light rays from the second lens array 4 to the projection lens aperture 92 for a conventional liquid crystal panel with micro-lenses.

Furthermore, in the conventional liquid crystal projector having the above-mentioned configuration, the reflector 52 is a parabolic mirror and therefore parallel light rays enter the first lens array 54, thereby leading to the disadvantage that the first lens array 54, the cold mirror 55, the second lens array 56 and the dichroic mirror 57 increase in size. The increased size of the second lens array 56 results in another disadvantage that the light utilization rate of a liquid crystal panel with micro-lenses, if employed, cannot be improved. The reason why the use of a liquid crystal panel with micro-lenses deteriorates the light utilization rate will be described with reference to FIGS. 10, 11, 12. FIG. 10 is a sectional view of a liquid crystal panel 85 with micro-lenses. Even when completely parallel light rays 86 are assumed to enter the liquid crystal panel 85, these light rays 86 emit from the liquid crystal panel as divergent light rays 88 at an angle e under the effect of the micro-lenses 87. Since the divergent light rays 88 pass through a pixel aperture 90 without being interrupted by a black matrix 89, however, the effective vignetting factor of the liquid crystal panel is improved for a higher light utilization rate. FIG. 11 is a diagram showing light rays from the second lens array 56 to a projection lens aperture 92 designed for a liquid crystal panel 91 without any micro-lenses. The incident angle f and the outgoing angle g of the liquid crystal panel 91 are designed to be equal to each other. FIG. 12 is a diagram showing light rays from the second lens array 56 to the projection lens aperture 92 for a liquid crystal panel 85 with micro-lenses. As apparent in comparison with FIG. 11, the liquid crystal panel with micro-lenses as shown in FIG. 12 has the outgoing angle g of the liquid crystal panel 85 increased by an amount equivalent to the divergent angle e. Even when the effective vignetting factor is improved by the micro-lenses 87, therefore, the eclipse developed at the projection lens aperture 92 prevents the light utilization rate from being improved.

SUMMARY OF THE INVENTION

The object of the present invention is to solve the above-mentioned problems of the prior art and to provide an easy-to-operate liquid crystal projector, in which the hot air exhausted from the exhaust fan is prevented from flowing toward the viewers located in the neighborhood of the liquid crystal projector, thus eliminating the feeling of discomfort to the viewers, in which it is not necessary to take care not to arrange an equipment easily succumbing to heat in the vicinity of the liquid crystal projector, in which no consideration is required not to place any object constituting a stumbling block to the exhaustion of the hot air in the path thereof, and in which the hot air exhausted from the exhaust fan is prevented from flowing into the projected light from the projection lens and fluctuating the image on the screen, while at the same time improving the exhaustion efficiency of the hot air. Another object of the invention is to provide a technique for improving the light utilization rate sufficiently even when a liquid crystal panel with micro-lenses is employed.

In order to achieve the above-mentioned objects, according to the present invention, there is provided a liquid crystal projector and a technique related thereto, in which (1) an exhaust fan is arranged adjacently to a projection lens and tilted in such a manner that the exhaust air from the exhaust fan flows far from the projected light of the projection lens, (2) the exhaust fan is arranged adjacently to the projection lens, a plurality of wind-directing plates are arranged and tilted in such a manner that the exhaust air from the exhaust fan flows far from the projected light of the projection lens and that the tilt angle of the wind-directing plate near to the projection lens is larger than that of the wind-directing plate far from the projection lens, (3) a first reflection mirror, a second lens array, a first dichroic mirror, a second dichroic mirror and a third reflection mirror are arranged in that order, and the arrangement of a first lens array, a light source and the exhaust fan is substantially parallel and adjacent to the arrangement of the projection lens, a dichroic prism and the second dichroic mirror, and (4) a reflector is made of an ellipsoidal mirror, and a concave lens is interposed between the reflector and the second lens array.

The above-mentioned configuration can easily achieve the objects of the invention.

DESCRIPTION OF THE PREFERRED EMBODIMENTS

Embodiments will be explained below with reference to the accompanying drawings.

Figure 1:
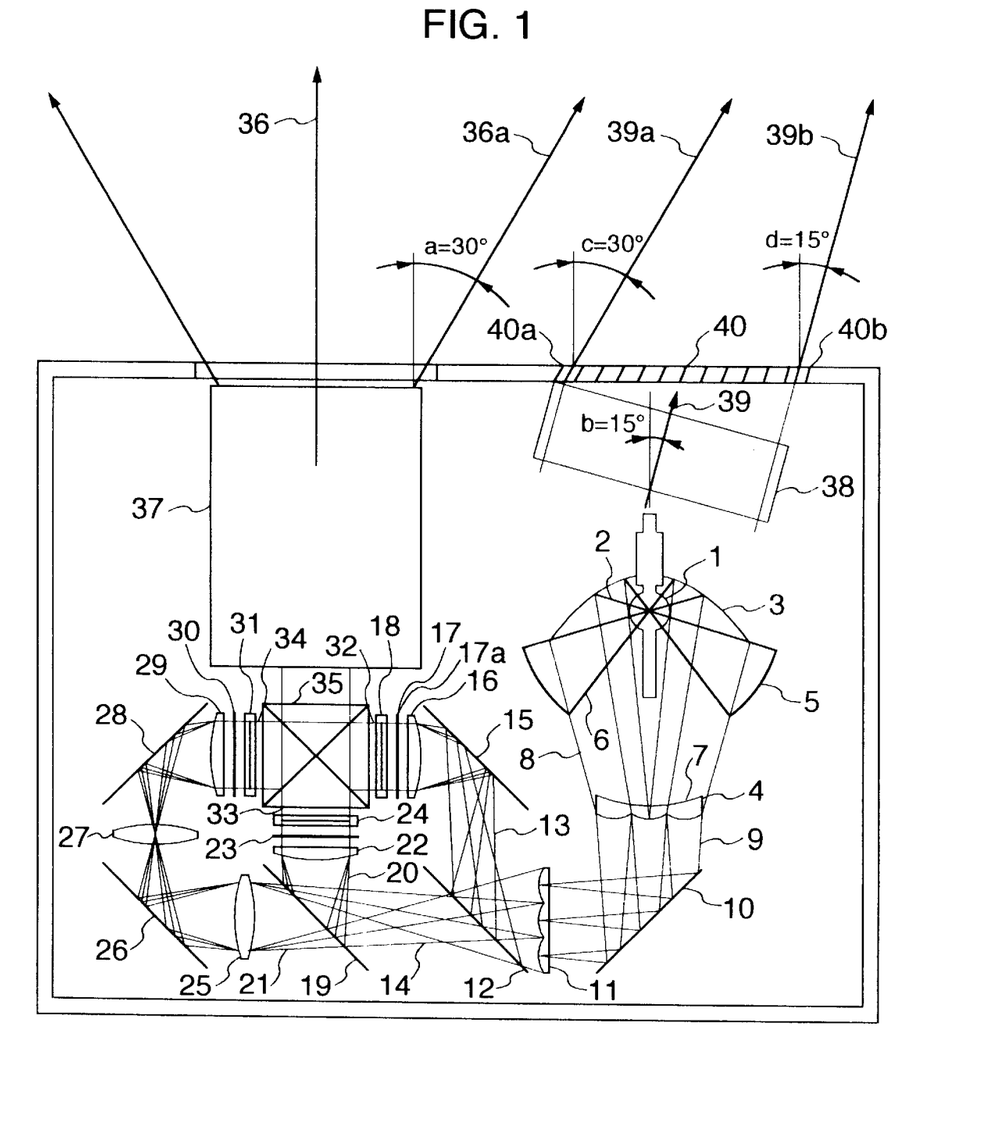
FIG. 1 is a top plan view of an optical system of a liquid crystal projector according to a first embodiment of the invention.

FIG. 1 is a top plan view of an optical system of a liquid crystal projector according to a first embodiment of the invention.

The illumination light 2 from a metal halide lamp 1 enters a first lens array 4 through a lamp reflector 3 of an ellipsoidal mirror. A lamp reflector 5 of a spherical mirror is inserted for the purpose of reusing the illumination light 6 not used conventionally by returning it to the metal halide lamp 1.

The first lens array 4 has an incident surface 7 of a concave lens and has the function of converting the convergent light rays 8 from the lamp reflector 3 of the ellipsoidal mirror into substantially parallel light rays, thus making it possible to reduce the size of the first lens array.

The light 9 leaving the first lens array 4 enters an increased reflection silver mirror 10 constituting a first reflection mirror, a second lens array 11 and a first dichroic mirror 12 for reflecting the B color light and transmitting the G and R color light 14, so that the B color light 13 is reflected and the G and R color light 14 are transmitted. The B color light 13 is reflected from an increased reflection aluminum mirror 15 constituting a second reflection mirror, and enters a B color light liquid crystal panel 18 constituting a first transmission liquid crystal panel through a condenser lens 16 and a polarizing plate 17. The G and R color light 14 enter a second dichroic mirror 19 for reflecting the G color light and transmitting the R color light, in which the G color light 20 is reflected and the R color light 21 is transmitted. The G color light 20 enters a G color light liquid crystal panel 24 making up a second transmission liquid crystal panel through a condenser lens 22 and a polarizing plate 23.

The R color light 21 enters a R color light liquid crystal panel 31 making up a third transmission liquid crystal panel through a relay lens 25, a cold mirror 26 constituting a third reflection mirror for transmitting the infrared light, a relay lens 27, an increased reflection silver mirror 28 constituting a fourth reflection mirror, a condenser lens 29 and a polarizing plate 30.

The B transmitted light 32 from the liquid crystal panel 18, the G transmitted light 33 from the liquid crystal panel 24 and the R transmitted light 34 from the liquid crystal panel 31 are synthesized in color by a dichroic prism 35. The outgoing light 36 thus synthesized in color is projected on a screen (not shown) by a projection lens 37.

In order to prevent the heat generated from the light source heated to a high temperature from having an effect on the component parts other than the light source, an exhaust fan 38 for cooling the light source is arranged in the neighborhood of the metal halide lamp 1, the lamp reflector 3 and the lamp reflector 5 thereby to exhaust the hot air 39 out of the housing of the liquid crystal projector.

The exhaust fan 38 is arranged adjacently to the projection lens 37 and tilted in order to keep the exhaust air 39 of the exhaust fan 38 far from the projected light 36 of the projection lens 37. The angle a of the portion 36a of the projected light 36 near to the exhaust air 39 is set to 30°, while the tilt angle b of the exhaust fan is set to 15°, so that the hot air 39 exhausted from the exhaust fan 38 is prevented from flowing into the projected light 36 of the projection lens 37. Thus the fluctuations of the image projected on the screen can be lessened.

Also, the exhaust fan 38 is arranged adjacently to the projection lens 37, and a plurality of tilted wind-directing plates 40 are arranged in such positions as to keep the exhaust air 39 of the exhaust fan 38 far from the projected light 36 of the projection lens 37. At the same time, the tilt angle c of the wind-directing plate 40a near to the projection lens 37 is set larger than the tilt angle d of the wind-directing plate 40b far from the projection lens 37. For example, the tilt angle c is set to 30°, and the tilt angle d is set to 15°. The tilt angle a of the portion 36a of the projected light 36 near to the exhaust air 39 and the tilt angle c of the wind-directing plate 40a near to the projection lens 37 are both set to the substantially same angle of 30°. Then, the hot air 39a discharged from the exhaust fan 38 is prevented from flowing into the projected light 36 from the projection lens 37 and thus the fluctuations of the image projected on the screen are reduced. Also, in the case where the tilt angle b of the exhaust fan 38 and the tilt angle d of the wind-directing plate 40b far from the projection lens 37 are set to the substantially same 150, on the other hand, the path of the hot air 39 is prevented from being changed considerably by the wind-directing plate 40b, with the result that the hot air can be exhausted more efficiently. The exhaust air 39b far from the projection lens 37 has a smaller effect than the exhaust air 39a near to the projection lens 37 on the fluctuations of the image projected on the screen caused by the hot air 39 exhausted from the exhaust fan 38 and flowing into the projected light 36 of the projection lens 37. The wind-directing plate 40b can thus be set to a tilt angle d smaller than the tilt angle c of the wind-directing plate 40a.

According to this embodiment, the first reflection mirror 10, the second lens array 11, the first dichroic mirror 12, the second dichroic mirror 19 and the third reflection mirror 26 are arranged in that order while at the same time arranging the first reflection mirror 10, the first lens array 4, the metal halide lamp 4 making up the light source and the exhaust fan 38 in that order so that the first outgoing light 13 separated by the first dichroic mirror 12 may constitute the light reflected from the first dichroic mirror 12 and so that the second outgoing light 14 separated by the first dichroic mirror 12 may constitute the light transmitted through the first dichroic mirror 12. At the same time, the arrangement of the first reflection mirror 10, the first lens array 4, the metal halide lamp 1 making up the light source and the exhaust fan 38 is substantially parallel and adjacent to the arrangement of the projection lens 37, the dichroic prism 35 and the second dichroic mirror 19.

In the liquid crystal projector having the above-mentioned configuration according to this embodiment, the hot air 39 exhausted by the exhaust fan 38 flows in the same direction as the light 36 outgoing from the projection lens 37. If viewers are located in the neighborhood along the direction of the light 36 outgoing from the projection lens 37, the outgoing light 36 would be intercepted by the viewers, thereby generating their shadow in the image on the screen. In view of the fact that the hot air is prevented from flowing toward the viewers in the neighborhood of the liquid crystal projector, however, the viewers feel no discomfort.

For the same reason, the video equipment such as the personal computer liable to easily succumb to the hot air, which may be located in the neighborhood of the liquid crystal projector, is not exposed to the hot air. Thus there is no need to take the position of the equipment into consideration. Also, care need not be taken not to place any object forming a stumbling block in the path of the hot air in order to exhaust the heat generated from the light source efficiently. In this way, the present invention can improve the operating convenience of the equipment.

Also, according to the present embodiment, the first dichroic mirror 12 has such a spectral characteristic as to reflect the B color light and transmit the G and R color light, and the second dichroic mirror 19 has such a spectral characteristic as to reflect the G color light and transmit the R color light. The B color light component can therefore be increased as compared with the R color light component. This is by reason of the fact that the mirrors 10, 12 and 15 can be used to reflect only the B color light, and the S polarized component higher in reflectance than the P polarized component can be utilized. As a result, the white color projected on the screen can be improved to a preferable color temperature. Especially, some glass or plastic materials used for optical parts (such as the polarizing plate and the liquid crystal al panel) of the liquid crystal projector reduce the light utilization rate of the B color light. Therefore, even the use of a light source of the same color temperature has so far been unable to prevent the reduction in color temperature. The above-mentioned configuration, in contrast, can make the most of the B color light component and therefore can minimize the reduction in color temperature.

Further, according to this embodiment, the first reflection mirror is configured of the increased reflection silver mirror 10, the third reflection mirror is configured of the cold mirror 26 for transmitting the infrared light and the fourth reflection mirror is configured of the increased reflection silver mirror 28 in order to prevent the reduction in the R color light which otherwise might be caused by the extraneous use of the relay lenses 25, 27 and the reflection mirrors 26, 28.

Figure 2:
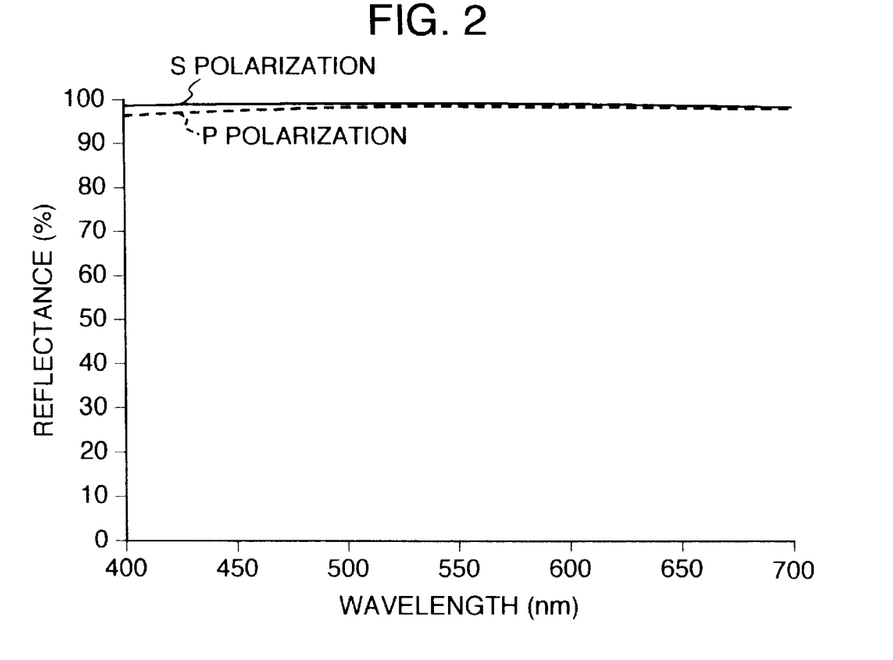
FIG. 2 is a graph showing the spectral reflectance characteristic of an increased reflection silver mirror.
Figure 3:
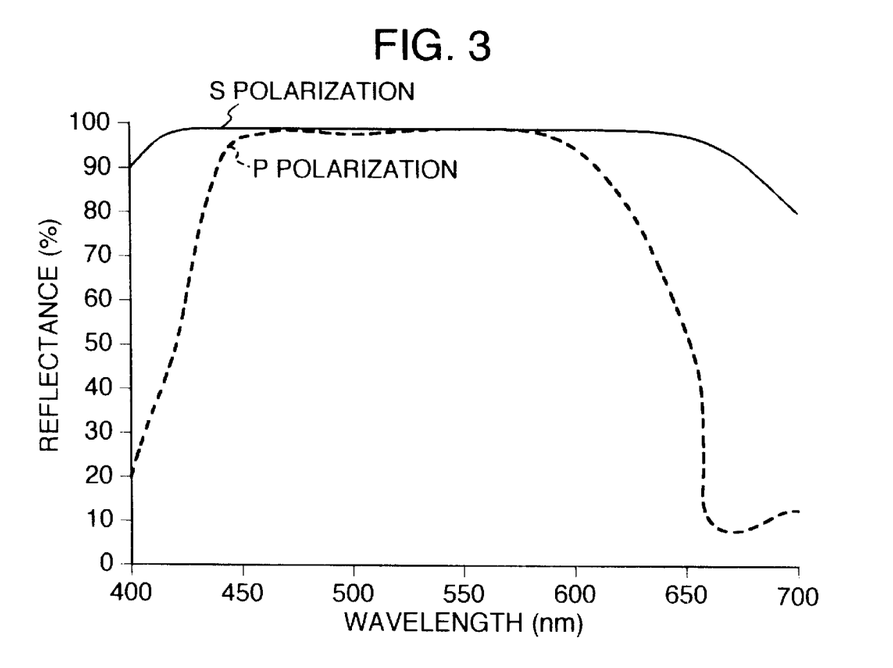
FIG. 3 is a graph showing the spectral transmittance of a cold mirror.

FIG. 2 is a graph showing the spectral reflectance characteristic of the increased reflection silver mirror, and FIG. 3 is a graph showing the spectral transmittance of the cold mirror. From these diagrams, the increased reflection silver mirror is seen to have a higher reflectance than the cold mirror. Especially, the P polarized component higher in transmittance than the S polarized component should be used for the R color light which uses the light transmitted through the dichroic mirrors 12, 19. The use of the increased reflection silver mirrors 10, 28 higher in the reflectance for the P polarized component, therefore, can minimize the reduction in the R color light. In the case where the increased reflection silver mirrors 10, 28 are used, however, the unnecessary infrared light and ultraviolet light are required to be cut off. According to this embodiment, the third reflection mirror is configured of the cold mirror 26 which transmits the infrared light. Consequently, the harmful infrared light is not irradiated on the polarizing plate 30 and the liquid crystal panel 31.

Furthermore, according to this embodiment, a UV cut filter for intercepting the ultraviolet light is arranged in the light path between the first dichroic mirror 12 and the polarizing plate 17 arranged on the incidence side of the first liquid crystal panel 18. In fact, the present embodiment includes a UV cut filter 17a formed on the incident surface of the polarizing plate 17.

The scope of the present invention is not limited to the configuration according to the first embodiment, in which in order to keep the exhaust air 39 of the exhaust fan 38 far from the projected light 36 of the projection lens 37, the exhaust fan 38 and a plurality of the wind-directing plates 40 are tilted and the tilt angle c of the wind-directing plate 40a near to the projection lens 37 is set larger than the tilt angle d of the wind-directing plate 40b far from the projection lens 37.

Figure 4:
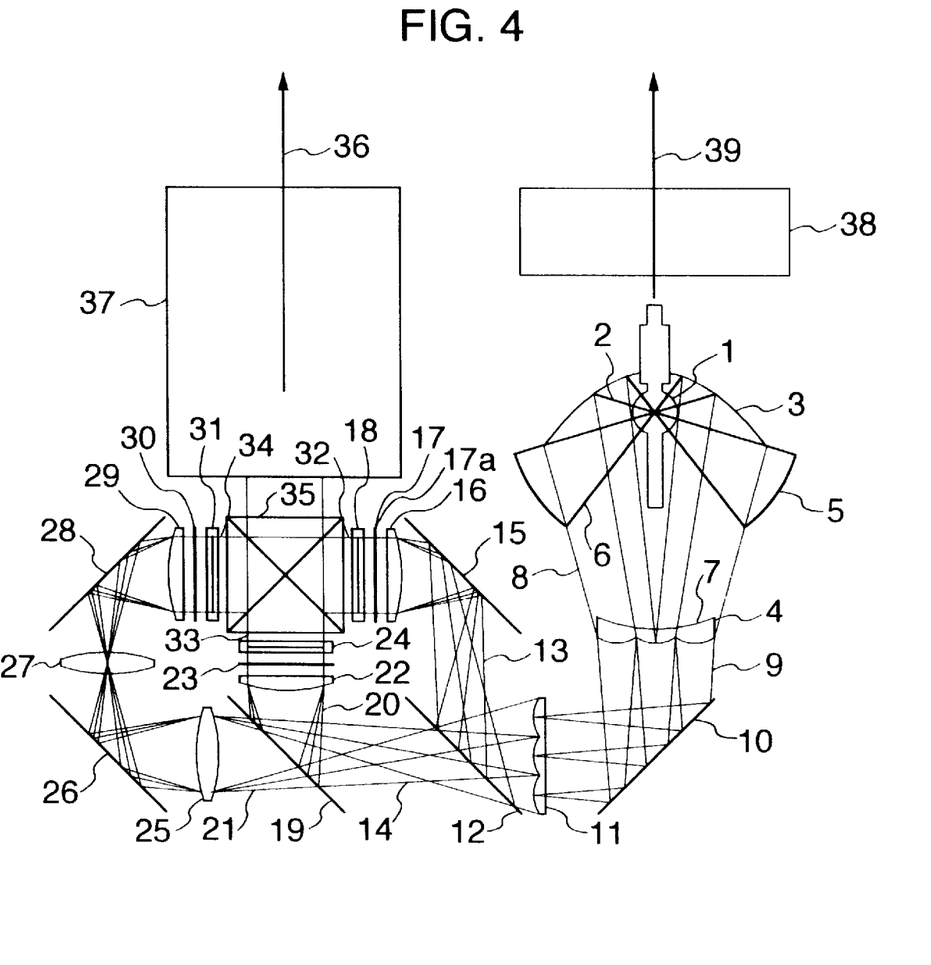
FIG. 4 is a top plan view of an optical system of a liquid crystal projector according to a second embodiment of the invention.

FIG. 4 is a diagram showing a second embodiment of the invention and is a top plan view of an optical system of a liquid crystal projector. This embodiment has the same configuration as the first embodiment except that in this embodiment, the exhaust fan 38 is not tilted and the wind-directing plates 40 are not shown. In this embodiment, like in the first embodiment, the hot air 39 exhausted from the exhaust fan 38 is prevented from flowing toward the viewers situated in the neighborhood of the liquid crystal projector, and care need not be exercised to take into consideration the position of the equipment which easily succumb to the heat in the neighborhood of the liquid crystal projector. Nor is it necessary to take care not to locate any object constituting a stumbling block to the flow of the hot air exhausted. The present invention is not limited to the second embodiment in which the portion of the first lens array near to the light source is formed of a concave lens. Alternatively, various configurations are possible in which the reflector 3 can be an ellipsoidal mirror and a concave lens can be interposed between the reflector 3 and the second lens array 11, for example.

Figure 5:
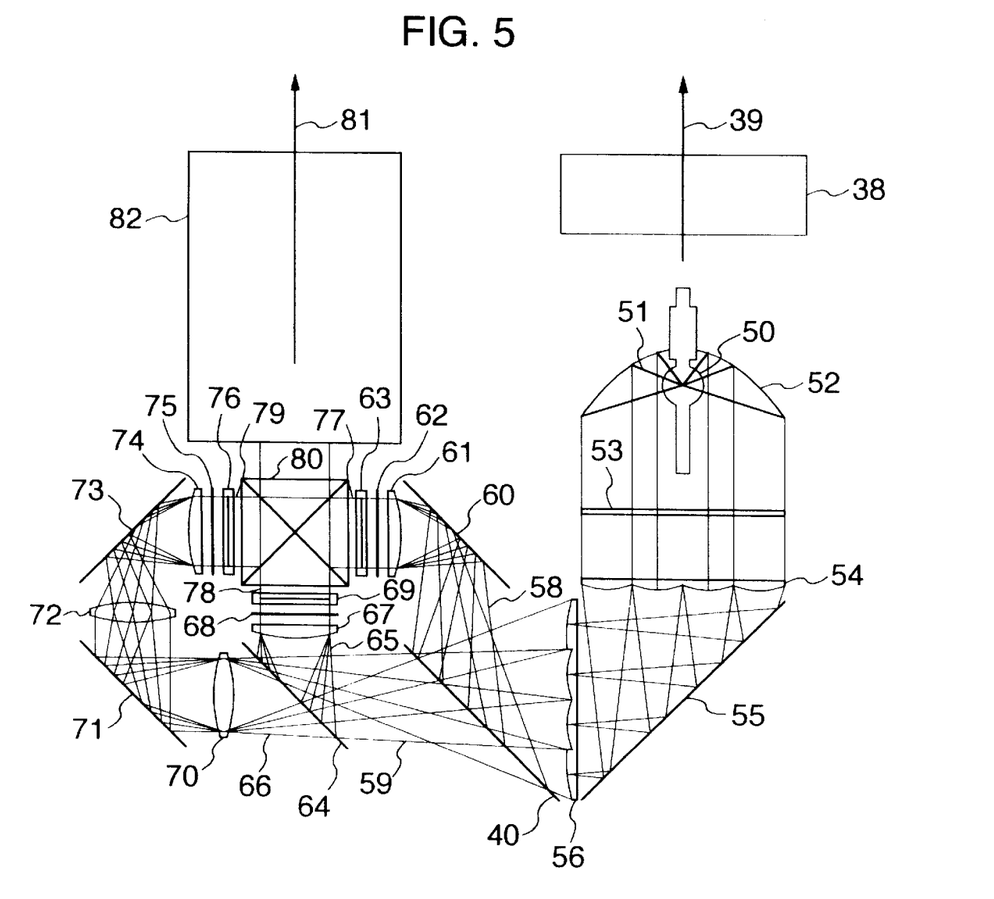
FIG. 5 is a top plan view of an optical system of a liquid crystal projector according to a third embodiment of the invention.

FIG. 5 is a diagram showing a third embodiment of the invention and is a top plan view of an optical system of a liquid crystal projector. The illumination light 51 from a metal halide lamp 50 constituting a light source enters a lamp reflector 52 of a parabolic mirror, a UV-IR cut filter 53, a first lens array 54, a cold mirror 55 constituting a first reflection mirror, a second lens array 56, and a first dichroic mirror for reflecting the R color light and transmitting the G and B color light. Thus, the R color light 58 is reflected and the G and B color light 59 is transmitted. The R color light 58 is reflected from an increased reflection aluminum mirror 60 constituting a second reflection mirror, and enters a R color light liquid crystal panel 63 constituting a first transmission liquid crystal panel through a condenser lens 61 and a polarizing plate 62. The G and B color light 59, on the other hand, enters a second dichroic mirror 64 for reflecting the G color light and transmitting the B color light, so that the G color light 65 is reflected and the B color light 66 is transmitted. The G color light 65 enters a G color light liquid crystal panel 69 constituting a second transmission liquid crystal panel through a condenser lens 67 and a polarizing plate 68. The B color light 66 enters a B color liquid crystal panel 76 constituting a third transmission liquid crystal panel through a relay lens 70, an increased reflection aluminum mirror 71 constituting a third reflection mirror, a relay lens 72, an increased reflection aluminum mirror 73 constituting a fourth reflection mirror, a condenser lens 74 and a polarizing plate 75. The R transmitted light 77 from the liquid crystal panel 63, the G transmitted light 78 from the liquid crystal panel 69 and the B transmitted light 79 from the liquid crystal panel 76 are synthesized in color by a dichroic prism 80. The outgoing light 81 thus synthesized in color is projected on a screen (not shown) by a projection lens 82.

In order to eliminate the effect that the heat generated from the high-temperature light source otherwise might have on the component parts other than the light source, a exhaust fan 38 for cooling the light source is arranged in the neighborhood of the metal halide lamp 50 constituting a light source and the lamp reflector 52. The hot air 39 thus is exhausted out of the housing (not shown) of the liquid crystal projector.

According to this embodiment, the first reflection mirror 55, the second lens array 56, the first dichroic mirror 40, the second dichroic mirror 64 and the third reflection mirror 71 are arranged in that order while at the same time arranging the first reflection mirror 55, the first lens array 54, the halide lamp 50 making up the light source and the exhaust fan 38 in that order, in order that the first outgoing light 58 separated by the first dichroic mirror 40 is reflected from the first dichroic mirror 40 and the second outgoing light 59 separated by the first dichroic mirror 40 is transmitted through the first dichroic mirror 40. At the same time, the arrangement of the first reflection mirror 55, the first lens array 54, the metal halide lamp 50 constituting the light source and the exhaust fan 38 is substantially parallel and adjacent to the arrangement of the projection lens 82, the dichroic prism 80 and the second dichroic mirror 64.

The above-mentioned configuration according to the third embodiment causes the hot air 39 emitted by the exhaust fan 38 to flow in the same direction as the outgoing light 81 of the projection lens 82, and therefore has an effect equivalent to that of the second embodiment.

Figure 6:
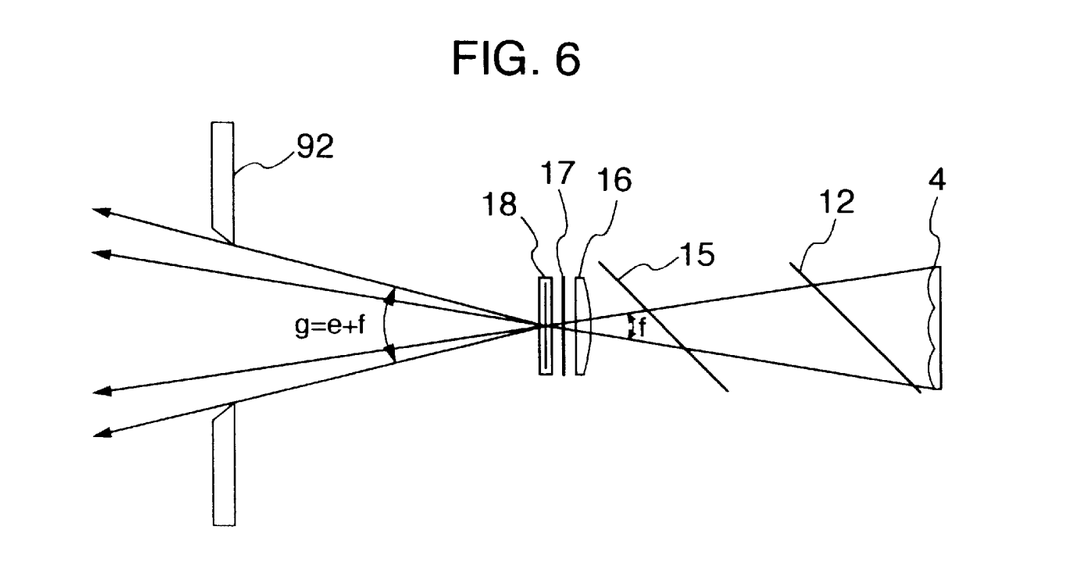
FIG. 6 is a diagram showing light rays from a second lens array 4 to a projection lens aperture 92.

FIG. 6 is a diagram showing light rays from the second lens array 4 to the projection lens aperture 92 for a liquid crystal panel 85 with micro-lenses employed according to this invention. Even in the case where the outgoing angle g of the liquid crystal panel 18 is increased by an amount equivalent to the divergence angle e described with reference to FIG. 10, the fact remains that the incident angle f can be reduced by reducing the size of the second lens array 4, and therefore the light utilization rate can be sufficiently improved without causing any eclipse in the projection lens aperture 92.

Figure 7:
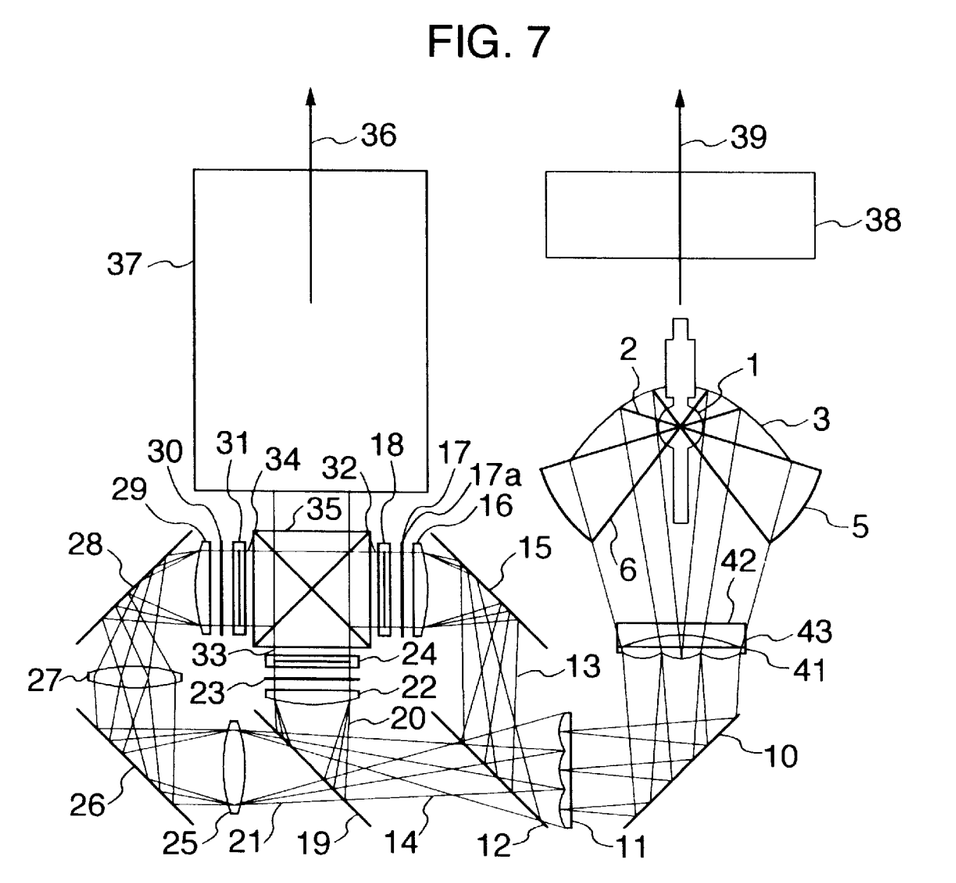
FIG. 7 is a top plan view of an optical system of a liquid crystal projector according to a fourth embodiment of the invention.

FIG. 7 is a top plan view of an optical system of a liquid crystal projector according to a fourth embodiment of the invention. This embodiment is different from the second embodiment in that in this embodiment, a flat concave lens 43 having a flat surface 42 near to the reflector 3 is interposed between the reflector 3 and the first lens array 41, and the first lens array 41 is configured of a flat convex lens. According to this embodiment, the aberration performance of the lenses can be improved so that the eclipse in the lens array 11 is minimized for a further improved light utilization rate.

Figure 8:
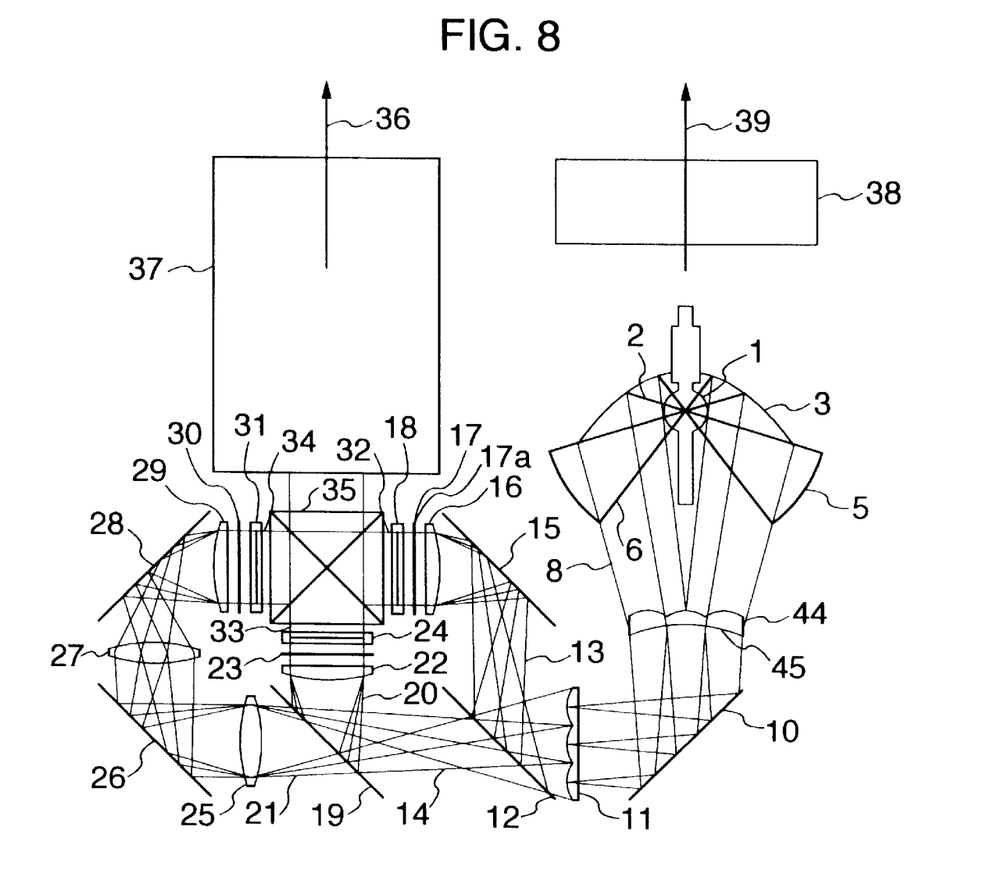
FIG. 8 is a top plan view of an optical system of a liquid crystal projector according to a fifth embodiment of the invention.

FIG. 8 is a top plan view of an optical system of a liquid crystal projector according to a fifth embodiment of the invention.

This embodiment is different from the second embodiment in that the portion of the first lens array 44 near to the second lens array 11 is configured of a concave lens 45. According to this embodiment, the aperture of the convex lens of the first lens array 44 is required to be somewhat reshaped from a rectangle. In spite of this requirement, the aberration performance of the lenses can be improved over the first embodiment, and therefore the eclipse in the lens array 11 is reduced for a further improved light utilization rate.

As described above, according to the present invention, the exhaust fan is arranged adjacently to the projection lens and tilted for the purpose of keeping the exhaust air of the exhaust fan far from the projected light. As a result, the hot air emitted from the exhaust fan is prevented from flowing toward the viewers situated in the neighborhood of the liquid crystal projector, and therefore the viewers feel no discomfort. Also, no care need be taken as to the position of the equipment which easily succumb to the heat in the neighborhood of the liquid crystal projector. Nor is it necessary to exercise care not to place any object forming a stumbling block to the exhaust hot air. In this way, the present invention improves the operating convenience while at the same time eliminating the fluctuations of the screen image since the hot air exhausted from the exhaust fan can be prevented from flowing into the projected light from the projection lens. Also, in this configuration, a plurality of wind-directing plates are arranged tilted in order to keep the exhaust air of the exhaust fan far from the projected light of the projection lens, and the tilt angle of the wind-directing plate nearer to the projection lens is set larger than the tilt angle of the wind-directing plate far from the projection lens, thereby facilitating the achievement of the above-mentioned various effects.

Further, according to the present invention, he first reflection mirror, the second lens array, the first dichroic mirror, the second dichroic mirror and the third reflection mirror are arranged in that order while at the same time arranging the first reflection mirror, the first lens array, the light source and the exhaust fan in that order, in order that the first outgoing light separated by the first dichroic mirror may be reflected from the first dichroic mirror and the second outgoing light separated by the first dichroic mirror may be transmitted through the first dichroic mirror. In addition, the arrangement of the first reflection mirror, the first lens array, the light source and the exhaust fan is substantially parallel and adjacent to the arrangement of the projection lens, the dichroic prism and the second dichroic mirror. The hot air exhausted from the exhaust fan, therefore, is prevented from flowing toward the viewers situated in the neighborhood of the liquid crystal projector, and the viewers thus feel no discomfort. Also, no care need be taken for the layout of the equipment easily succumbing to heat in the neighborhood of the liquid crystal projector, nor is it necessary to take care not to place any object forming a stumbling block to the exhaust path of the hot air, thus improving the operating convenience.

Further, according to this invention, the provision of a reflector as an ellipsoidal mirror and a concave lens interposed between the reflector and the second lens array can provide the function of converting the convergent light rays from the reflector into substantially parallel light rays. The first lens array and the second lens array can thus be reduced in size. As a consequence, even in the case where a liquid crystal panel with micro-lenses is employed, the light utilization rate can be sufficiently improved.

Since certain changes may be made in the above-mentioned liquid crystal projector without departing from the spirit and features of the invention herein involved, it is intended that all matter contained in the above description or shown in the accompanying drawings shall be interpreted as illustrative and not in a limiting sense. The scope of the invention is indicated by the claims thereof. Modifications and changes within the scope of the claims are all included in the scope of the invention.

We claim:

1. A liquid crystal projector for irradiating the illumination light from a light source on a plurality of liquid crystal panels and projecting the light outgoing from said liquid crystal panels on a screen by a projection lens, comprising:

an exhaust fan arranged adjacent to said projection lens for exhausting the internal air of the liquid crystal projector to outside, said exhaust fan being tilted at an angle to the optical axis of the projection lens in such a manner as to direct the exhaust air of said exhaust fan away from the light projected from said projection lens, wherein said exhaust fan is disposed on a same surface of the liquid crystal projector as said projection lens is positioned.

2. A liquid crystal projector for irradiating the illumination light from a light source on a plurality of liquid crystal panels and projecting the light outgoing from said liquid crystal panels on a screen by a projection lens, comprising:

an exhaust fan arranged adjacent to said projection lens for exhausting the internal air of the liquid crystal projector to outside, wherein said exhaust fan is disposed on a same surface of the liquid crystal projector as said projection lens is positioned; and a plurality of wind-directing plates arranged at an angle to the optical axis of said projection lens in such a manner that the exhaust air of said exhaust fan is directed away from the light projected by said projection lens.

3. A liquid crystal projector for irradiating the illumination light from a light source on a plurality of liquid crystal panels and projecting the light outgoing from said liquid crystal panels on a screen by a projection lens, comprising:

an exhaust fan for exhausting the internal air of the liquid crystal projector to outside; and a plurality of wind-directing plates arranged at an angle to the optical axis of said projection lens in such a manner that the exhaust air of said exhaust fan is directed away from the light projected by said projection lens, and the angle of the wind-directing plate nearer to the projection lens is differentiated from the angle of the wind-directing plate farther away from the projection lens.

4. A liquid crystal projector for irradiating the illumination light from a light source on a plurality of liquid crystal panels and projecting the light outgoing from said liquid crystal panel on a screen by a projection lens, comprising:

an exhaust fan for exhausting the internal air of the liquid crystal projector to outside; and a plurality of wind-directing plates arranged at an angle to the optical axis of said projection lens in such a manner that the exhaust air of said exhaust fan is directed away from the light projected by said projection lens, and the angle of the wind-directing plate nearer to the projection lens is larger than the angle of the wind-directing plate farther away from the projection lens.

5. A liquid crystal projector for irradiating the illumination light from a light source on a plurality of liquid crystal panels and projecting the light outgoing from said liquid crystal panels on a screen by a projection lens, comprising:

an exhaust fan arranged adjacent to said projection lens for exhausting the internal air of the liquid crystal projector to outside, said exhaust fan being tilted at an angle to the optical axis of said projection lens in such a manner as to direct the exhaust air of said exhaust fan away from the projected light of said projection lens, wherein said exhaust fan is disposed on a same surface of the liquid crystal projector as said projection lens is positioned; and a plurality of wind-directing plates arranged at an angle to the optical axis of said projection lens in such a manner that the exhaust air of said exhaust fan is directed away from the light projected by said projection lens.

6. A liquid crystal projector for irradiating the illumination light from a light source on a plurality of liquid crystal panels and projecting the light outgoing from said liquid crystal panel on a screen by a projection lens, comprising:

an exhaust fan arranged adjacent to said projection lens for exhausting the internal air of the liquid crystal projector to outside, said exhaust fan being tilted at an angle to the optical axis of said projection lens in such a manner as to direct the exhaust air of said exhaust fan away from the projected light of said projection lens; and a plurality of wind-directing plates arranged at an angle to the optical axis of said projection lens in such a manner that the exhaust air of said exhaust fan is directed away from the light projected by said projection lens, and the angle of the wind-directing plate near to said projection lens is differentiated from the angle of the wind-directing plate farther away from said projection lens.

7. A liquid crystal projector for irradiating the illumination light from a light source on a plurality of liquid crystal panels and projecting the light outgoing from said liquid crystal panels on a screen by a projection lens, comprising:

an exhaust fan arranged adjacent to said projection lens for exhausting the internal air of the liquid crystal projector to outside, said exhaust fan being tilted at an angle to the optical axis of said projection lens in such a manner as to direct the exhaust air of said exhaust fan away from the projected light of said projection lens; and a plurality of wind-directing plates arranged at an angle to the optical axis of said projection lens in such a manner that the exhaust air of said exhaust fan is directed away from the light projected by said projection lens, and the angle of the wind-directing plate near to said projection lens is larger than the angle of the wind-directing plate farther away from said projection lens.

8. A liquid crystal projector comprising:

a light source;

a first lens array;

a first reflection mirror;

a second lens array;

a first dichroic mirror wherein said first dichroic mirror separates light from said light source into a first outgoing light and a second outgoing light;

means for applying the illumination light from said light source to said first dichroic mirror through said first lens array, said first reflection mirror and said second lens array;

a second reflection mirror;

a first liquid crystal panel;

wherein said first dichroic mirror reflects the first outgoing light onto said second reflection mirror;

a second dichroic mirror;

wherein said first dichroic mirror transmits the second outgoing light to said second dichroic mirror;

a second liquid crystal panel;

means for applying the first outgoing light separated in color by said second dichroic mirror to said second liquid crystal panel;

a third reflection mirror;

a fourth reflection mirror;

a third liquid crystal panel;

means for irradiating the second outgoing lighted separated in color by said second dichroic mirror on said third liquid crystal panel through said third reflection mirror and said fourth reflection mirror;

a dichroic prism;

wherein said dichroic prism synthesizes in color the transmitted light from said first liquid crystal panel, the transmitted light from said second liquid crystal panel and the transmitted light from said third liquid crystal panel;

a projection lens;

a screen;

means for projecting said outgoing light synthesized in color on said screen by said projection lens; and an exhaust fan;

wherein said first reflection mirror, said second lens array, said first dichroic mirror, said second dichroic mirror and said third reflection mirror are arranged collinearly, concurrently while said first reflection mirror, said first lens array, said light source and said exhaust fan are arranged collinearly, and the line formed by connecting said first reflection mirror, said first lens array, said light source and said exhaust fan is substantially parallel and adjacent to the line formed by connecting said projection lens, said dichroic prism and said second dichroic mirror.

9. A liquid crystal projector according to claim 8, wherein said first dichroic mirror has such a spectral characteristic that the B color light is reflected and the G and R color light is transmitted, and said second dichroic mirror has such a spectral characteristic that the G color light is reflected and the R color light is transmitted.

10. A liquid crystal projector according to claim 8, wherein said first reflection mirror is an increased reflection silver mirror, selected one of said third reflection mirror and said fourth reflection mirror is an increased reflection silver mirror, and the remaining one of said reflection mirrors is a cold mirror for transmitting the infrared light.

11. A liquid crystal projector according to claim 8, wherein said first reflection mirror is an increased reflection silver mirror, said liquid crystal projector further comprising a UV cut filter arranged in the light path between said first dichroic mirror and a polarizing plate disposed on the incident side of said first liquid crystal panel for intercepting the ultraviolet light.

12. A liquid crystal projector comprising:

a light source;

at least one reflector;

a first lens array;

a second lens array;

a plurality of liquid crystal panels;

means for irradiating the illumination light from said light source on said liquid crystal panels through said reflector, said first lens array and said second lens array;

a projection lens;

a screen;

means for projecting the light outgoing from said liquid crystal panels on said screen by said projection lens;

a reflector of an ellipsoidal mirror; and a concave lens inserted between said reflector of an ellipsoidal mirror and said second lens array.

13. A liquid crystal projector according to claim 12, wherein said liquid crystal panel includes at least one micro-lens array.

14. A liquid crystal projector according to claim 12, wherein the portion of said first lens array nearer to said light source includes a concave lens.

15. A liquid crystal projector according to claim 12, wherein said flat concave lens is inserted between said reflector of an ellipsoidal mirror and said first lens array and having a flat surface nearer to said reflector, said first lens array being a flat convex lens.

16. A liquid crystal projector according to claim 12, wherein the portion of said first lens array nearer to said second lens array is a concave lens.

* * * * *